United States Patent [19]

Kakiuchi et al.

[11] Patent Number: 5,136,674
[45] Date of Patent: Aug. 4, 1992

[54] LIGHT ADMITTING DEVICE

[75] Inventors: Shinichi Kakiuchi; Kohei Iketani, both of Tokyo, Japan

[73] Assignee: Asahi Kogaku Kogyo K.K., Tokyo, Japan

[21] Appl. No.: 677,040

[22] Filed: Mar. 29, 1991

[30] Foreign Application Priority Data

Apr. 17, 1990 [JP] Japan .................................. 2-102213

[51] Int. Cl.[5] ................................................ G02B 6/04
[52] U.S. Cl. ...................................... 385/115; 385/121
[58] Field of Search ................ 350/96.10, 96.20, 96.24, 350/96.25, 96.26

[56] References Cited

U.S. PATENT DOCUMENTS

| 4,057,338 | 11/1977 | Yevick ...................................... 355/1 |
| 4,734,918 | 3/1988 | Bauer et al. .......................... 374/131 |
| 4,874,227 | 10/1989 | Matsukawa et al. .................. 350/334 |
| 4,930,849 | 6/1990 | Tanaka .................................. 350/6.6 |
| 4,932,747 | 6/1990 | Russell et al. ..................... 350/96.24 |
| 4,952,022 | 8/1990 | Genovese .......................... 350/96.24 |
| 4,983,015 | 1/1991 | Bourguignat et al. ............ 350/96.25 |
| 4,997,259 | 3/1991 | Ichimura et al. ................. 350/96.24 |

FOREIGN PATENT DOCUMENTS

| 0148919 | 9/1988 | European Pat. Off. . |
| 3708959 | 9/1987 | Fed. Rep. of Germany . |
| 3822885 | 1/1989 | Fed. Rep. of Germany . |
| 3812418 | 10/1989 | Fed. Rep. of Germany . |
| 3921489 | 1/1991 | Fed. Rep. of Germany . |
| 2-19002 | 2/1990 | Japan . |

*Primary Examiner*—Frank Gonzalez
*Attorney, Agent, or Firm*—Sughrue, Mion, Zinn Macpeak & Seas

[57] ABSTRACT

An optical fiber assembly is used to conduct incident light from, e.g., a light-diffusing plate to a photodetecting apparatus such as an automatic white balance sensor equipped with an RGB filter. The light-admitting ends of the fibers are distributed substantially uniformly across the light-admitting end of the fiber assembly, and the light-issuing ends of the fibers are arranged in a predetermined pattern, e.g., they are grouped in accordance with the arrangement of the RGB filter.

3 Claims, 3 Drawing Sheets

LIGHT ADMITTING DEVICE

BACKGROUND OF THE INVENTION

This application is based on and claims priority from Japanese Application No. Hei. 2-102213 filed Apr. 17, 1990, the disclosure of which is incorporated by reference herein.

This invention relates to a light admitting device and, more particularly, relates to a light admitting device suitable for use in a photodetecting apparatus such as a white balance sensor.

Automatic white balance sensors used in electronic still cameras and other imaging apparatus are adapted to operate in the following way. The ratios of respective light components, i.e., R (red), G (green) and B (blue) components, obtained through an RGB filter assembly provided on the light-receiving surface are detected and the resulting detection signals (e.g. R/G and B/G) are used to control the gains of amplifier circuits for color signals contained in the video signal output from the imaging device in such a way that the image of a white object will be reproduced white under any kind of light source, thereby achieving optimal color reproduction in accordance with the color temperature of a light source.

FIG. 5 is a typical circuit diagram for electronic still cameras and other imaging apparatus that are adapted to achieve color reproduction associated with various color temperatures. The circuit shown in FIG. 5 includes an imaging device 20 typically formed of a CCD, a color separator circuit 21 for extracting red (R) and blue (B) primary color signals from each video signal from the imaging device 20, and a luminance signal processing circuit 22 for separating a luminance signal $Y_L$ from each video signal from the imaging device 20. The R and B signals issuing from the color separator circuit 21 are amplified by associated amplifier circuits 23 and 24 and are respectively supplied into a $\gamma$-correction/matrix circuit 25. The luminance signal $Y_L$ issuing from the luminance signal processing circuit 22 is also supplied into the $\gamma$-correction/matrix circuit 25. The circuit 25 outputs two color-difference signals, R-Y and B-Y, as well as luminance signal $Y_L$, all of which serve to generate an NTSC color television signal.

Shown by 26 in FIG. 5 is an automatic white balance sensor which outputs R, G and B signals associated with respective color temperatures. Those signals are converted to logarithmic values by means of a logarithmic converter circuit 27. Of the three logarithmic signals, those for log R and log G are supplied to a first differential voltage generating circuit 28 which constructs an R white balance control voltage R/G from the differential voltage for the two input signals. The logarithmic signal for log B from the converter circuit 27 is supplied together with the signal for log G to a second differential voltage generating circuit 29 which constructs a B white balance control voltage B/G from the differential voltage for the two input signals.

The two control voltages R/G and B/G thus produced from the differential voltage generating circuits 28 and 29 are fed into the associated R and B amplifier circuits 23 and 24, and the gains of the respective amplifiers are controlled in such a way that the image of a white object will be produced white under any kind of light source.

The white balance sensor used in the system described above must be so designed that the RGB light-receiving region is illuminated uniformly irrespective of the angle of incidence of light falling on that region. In the prior art, the combination of a light-diffusing plate filter and a luminosity compensating filter has been provided on the light-receiving surface of the sensor so that uniform illumination will occur in the RGB light-receiving region. However, in the prior art automatic white balance sensor having the construction described above, the light-receiving surface of the light-diffusing plate is parallel and in proximity to that of the sensor, and any change in the angle of incidence of light falling on the diffusing plate or any directivity of the incident light will directly affect the light-receiving surface of the sensor so that it will not be illuminated uniformly with the incident light.

Particularly, in the case where the RGB color filter assembly provided on the light-receiving surface of the sensor is a striped type, uneven illumination occurs on the light-receiving surface if incident light is admitted sideways, i.e., in a direction normal to the stripes. One may consider increasing the thickness of the light-diffusing plate in order to achieve even illumination, but then less light is admitted by the light-receiving surface of the sensor and the level of the output from the automatic white balance sensor will decrease to make it highly susceptible to external noise.

SUMMARY OF THE INVENTION

The present invention is directed to solving the problems discussed above, and it is an object of the invention to provide a light admitting device capable of producing uniform output light even in the presence of unevenness in the incident light.

This and other objects are achieved according to the present invention by the provision of a light admitting device comprising an optical fiber assembly, in which the exit ends of the individual optical fibers in the fiber assembly are grouped in a predetermined pattern, whereas the entrance ends of the optical fibers distributed uniformly over the whole area.

In the device of the present invention, incident light is guided through optical fibers whose entrance ends are distributed uniformly, so that each of the grouped light outputs of the fiber assembly is a composite of components uniformly picked up from the entire incident light. Thus, even if incident light that would otherwise cause an uneven output pattern is admitted to the device, it is distributed equally among a plurality of grouped outputs to thereby avoid an influence of the unevenness.

BRIEF DESCRIPTION OF THE DRAWINGS

The invention will be more clearly understood from the following description with reference to the accompanying drawings, wherein.

DESCRIPTION OF THE PREFERRED EMBODIMENT

Figure 1:
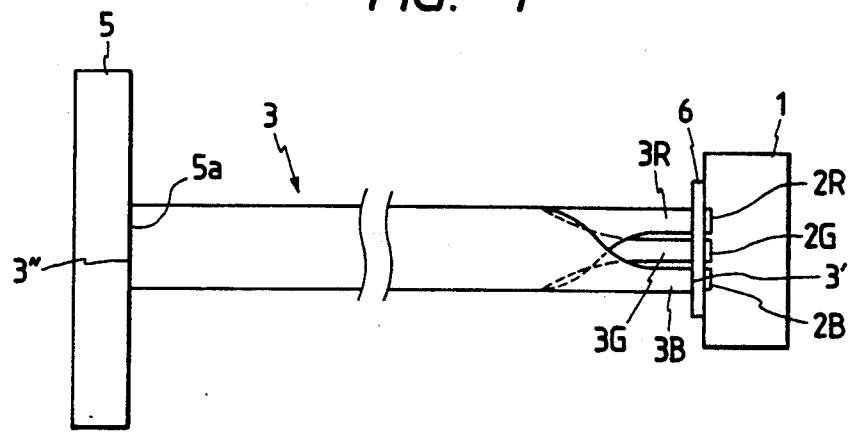
FIG. 1 is a schematic view of a light admitting device according to an embodiment of the present invention.
Figure 2:
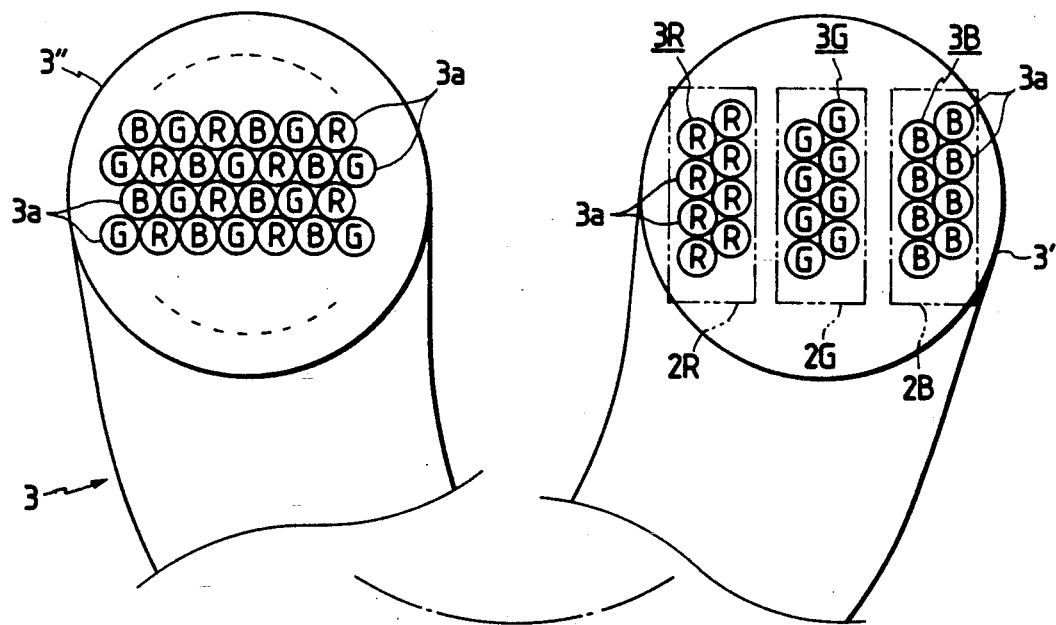
FIG. 2 illustrates an arrangement of optical fibers in the device of FIG. 1.

The preferred embodiment of the present invention will now be described with reference to FIGS. 1 and 2, with FIG. 1 showing a schematic view of the light-admitting device according to thee preferred embodiment, and FIG. 2 showing the arrangement of the optical fibers in the device.

Reference number 1 designates an automatic white balance sensor which has stripe type R, G and B color filters 2R, 2G and 2B, respectively, provided on its light-receiving surface. 3 designates an optical fiber assembly for guiding external light to the light receiving surface of the sensor 1. The assembly 3 consists of a plurality of optical fibers 3a bundled together.

At the light-issuing end portion 3' of the assembly 3, the optical fibers are arranged into three groups 3R, 3G and 3B in association with the respective color filters 2R, 2G and 2B. The individual fibers 3a in the three groups 3R, 3G and 3B are arranged closely to one another within the shaped patterns of the respective color filters 2R, 2G and 2B as shown in FIG. 2, and the light-issuing end portions of the three fiber groups 3R, 3G and 3B at the end 3' of the fiber assembly are in an exact face-to-face relationship with the corresponding color filters 2R, 2G and 2B.

The light-admitting end portion 3" of the optical fiber assembly 3 is coupled to the light-issuing face 5a of a light-diffusing plate 5 that is typically made of a milk-white acrylic resin. The light-admitting end portions of the individual optical fibers 3a at the end 3" of the fiber assembly are arranged in a mosaic pattern so that they are distributed uniformly over the whole area of the light-issuing face 5 a of the diffusing plate 5, more specifically, so that light beams guided by the individual optical fibers 3a adjacent to each other at the end 3" are incident on the different color filters.

Shown by 6 in FIG. 1 is a luminosity-compensating filter that is provided between the light-issuing end portion 3' of the optical fiber assembly 3 and each of the color filters 2R, 2G and 2B. The filter 6 causes the spectral distribution characteristics in the visible range (380 to 780 nm) of diffuse light traveling through the optical fiber assembly 3 into the automatic white balance sensor 1 to match the spectral characteristics of an imaging device.

The device constructed in the manner described above will operate in the following way. When external light is incident on the front face of the light-diffusing plate 5, it diffuses through the plate 5 and the resulting diffuse light emerges from the light-issuing face 5a to be guided into the optical fiber assembly 3. At the other end of the fiber assembly 3, the light is distributed among the respective fiber groups 3R, 3G and 3B and passes through the luminosity-compensating filter 6, whereupon light in the wavelength range of 380 to 780 nm is picked up and illuminates the associated color filters 2R, 2G and 2B. The light passing through the respective color filters 2R, 2G and 2B is detected with the automatic white balance sensor 1 and the detection signals are subsequently processed for white balancing.

Since the optical fibers 3a are distributed uniformly over the whole area of the light-issuing face 5a of the light-diffusing plate 5, the light emerging from the respective fiber groups 3R, 3G and 3B to be launched into the color filters 2R, 2G and 2B is a composite of all components of the diffuse light passing through the diffusing plate 5 that have been picked up from every part of the light-issuing face 5a of that plate. Therefore, even if the light incident on the diffusing plate 5 is directional or of such a nature as to produce light and dark areas depending on the angle of incidence, the light will be uniformly distributed among the color filters 2R, 2G and 2B on the light-receiving surface of the sensor, whereby uniform illumination of those filters can be achieved.

Further, the optical fibers 3a permit incident light to be launched to the light-receiving surface of the sensor from a fixed direction, so that even if the incident light is of such a nature as to cause uneven illumination of the diffusing plate 5, consistent output can be obtained from the sensor.

A further advantage of using the optical fibers 3a is that there is no inherent limitation on the relative positions of the light diffusing plate 5 and the automatic white balance sensor 1, and this increases the flexibility of system design and contributes to the manufacture of a compact system.

If desired, the exit end portions of the optical fibers 3a connected to the color filters 2R, 2G and 2B may be closely packed to increase the intensity of light incident on the light receiving surface of the sensor.

Figure 3:
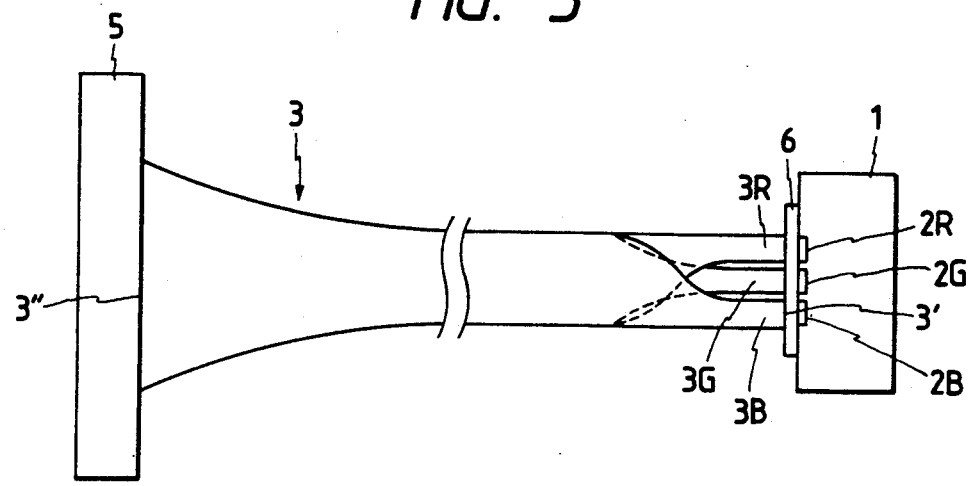
FIG. 3 is a schematic view of a light admitting device according to a modification of the embodiment of FIGS. 1 and 2.
Figure 4:
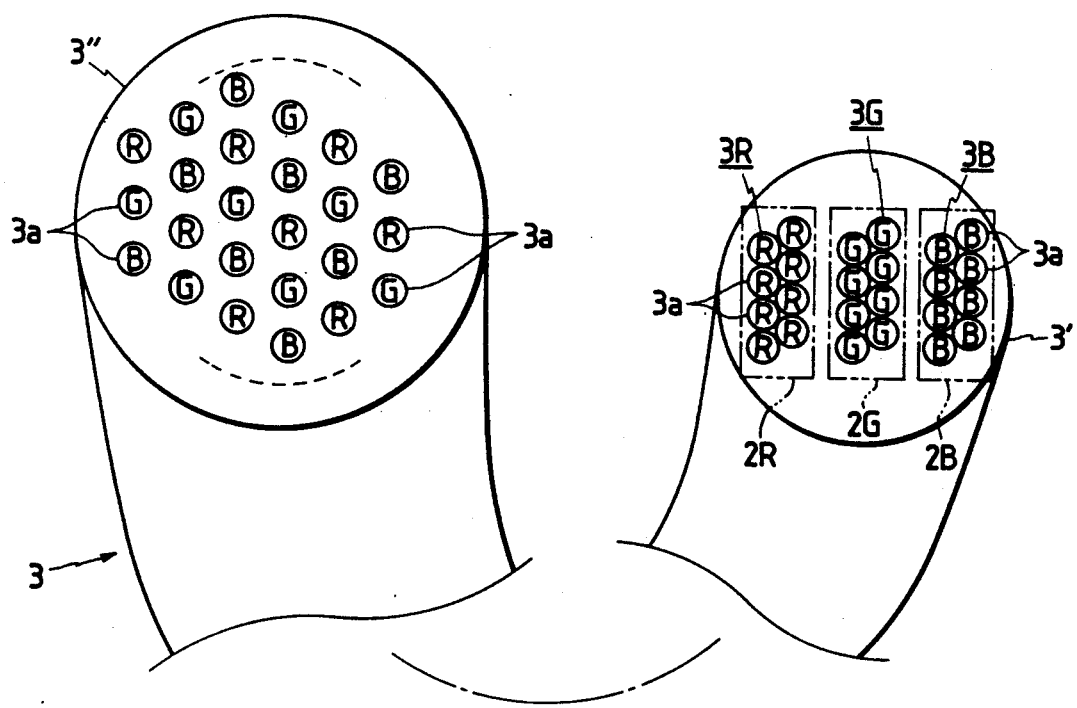
FIG. 4 illustrates an arrangement of optical fibers in the device of FIG. 3.
Figure 5:
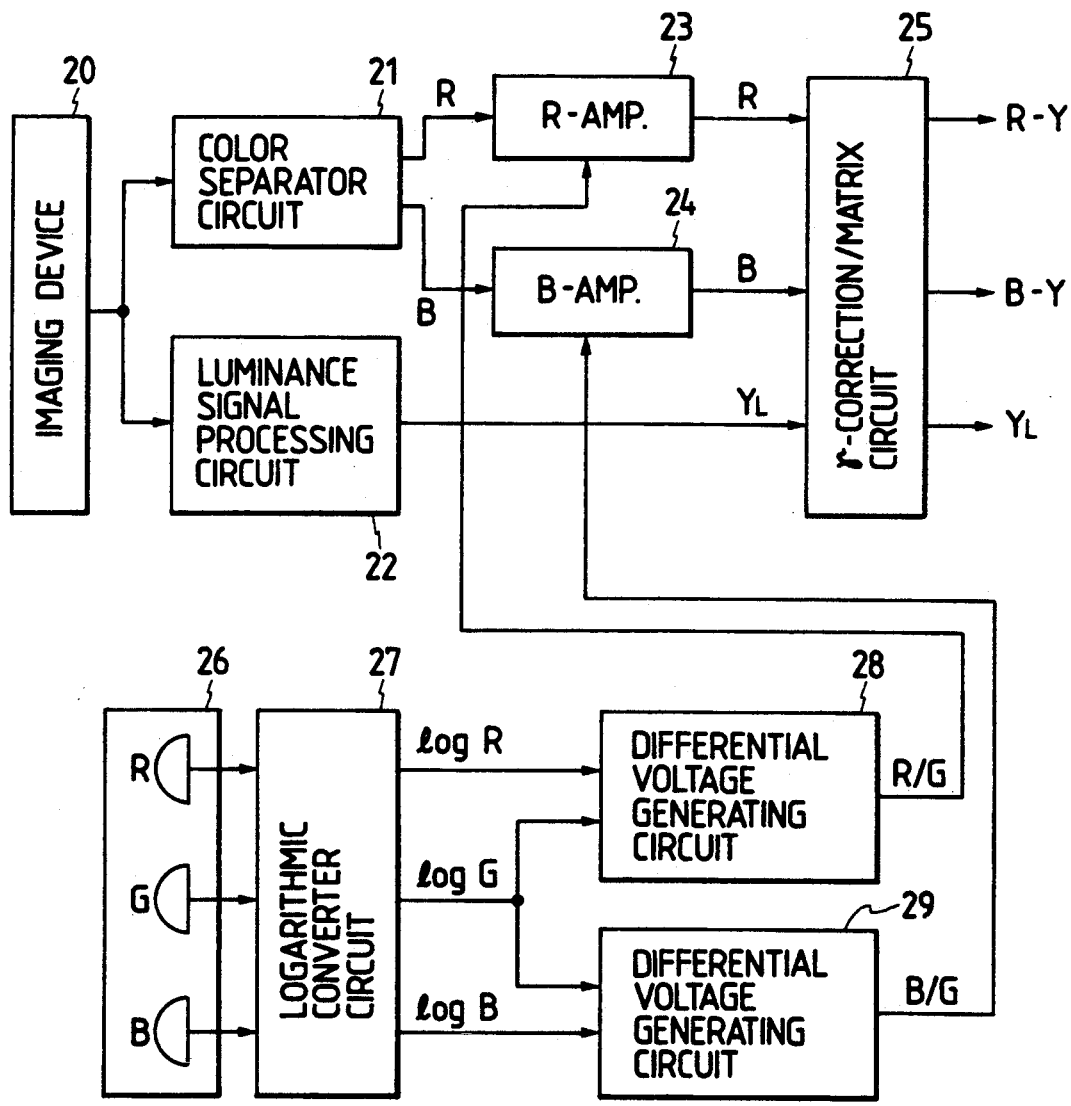
FIG. 5 shows a circuit diagram for a conventional electronic still camera or other imaging apparatus.

In the embodiment described above, the collective area of the optical fibers 3a at the end 3' (i.e., on the side of the light receiving surface of the sensor 1) is the same as that of fibers at the other end 3" where they are connected to the light-diffusing plate 5, but this is not a requirement of the invention. If desired, as shown in FIGS. 3 and 4, the collective area of the optical fibers at the entrance end 3" may be made larger than that at the exit end 3', and this has the advantage of increasing the range over which light can be guided into the automatic white balance sensor. Even in the modification of FIGS. 3 and 4, the diameter of a single optical fiber 3a is kept constant throughout its whole length. A larger space is provided between the adjacent individual optical fibers 3a in the entrance end 3" than in the exit end 3'.

It should also be mentioned that the optical fibers 3a at the entrance end 3" and exit end 3' may be arranged in patterns other than as illustrated in FIG. 2.

Further, there is no particular limitation on the site at which the luminosity-compensating filter 6 is to be positioned, but it may be provided within the optical fiber assembly 3, at the entrance end of optical fibers 3a, or in any other appropriate position.

As will be clear from the above description, the device of the present invention permits diffuse light to be directed to the RGB light-receiving surface of an automatic white balance sensor by way of an optical fiber assembly. In addition, at the end of the fiber assembly connected to the RGB light-receiving surface, the ends of the optical fibers are grouped in association with the respective R, G and B color filters, whereas at the end of the fiber assembly connected to the light-diffusing member 5 the ends of the fibers are distributed uniformly over the whole area of the light-issuing face of the member 5. Because of this arrangement, the light-receiving surface of the sensor 1 can be uniformly illuminated even if there is unevenness in the light incident to the plate 5.

What is claimed is:

1. A light conducting device comprising a light diffusing plate for receiving and diffusing light, an optical fiber assembly having a light-admitting end for receiving light from said light diffusing plate and having a light-issuing end for providing a light output in accordance with the light received at said light-admitting end, said fiber assembly comprising a plurality of fibers arranged in a second pattern at said light-admitting end and arranged in a second pattern at said light-issuing end, said second pattern comprising a plurality of groups and said first pattern comprising a uniform distribution of fibers collectively from all groups, said device further comprising a filter assembly including a plurality of color filters each adjacent a respective group of fibers at said light-issuing end.

2. A device according to claim 1, wherein a collective surface area of ends of said fibers at said light-admitting end of said fiber assembly is greater than a collective surface area of ends of said fibers at said light-issuing end of said fiber assembly.

3. A device according to claim 1, wherein said filter assembly comprises an RGB filter assembly.

* * * * *